United States Patent
Roberts et al.

(10) Patent No.: US 12,053,722 B2
(45) Date of Patent: Aug. 6, 2024

(54) APPARATUS AND METHOD FOR IMPROVING THE EFFICIENCY OF A NEW OR EXISTING FILTER FOR FILTERING WATER OR WASTEWATER

(71) Applicant: Roberts Water Technologies, Inc., Coatesville, PA (US)

(72) Inventors: R. Lee Roberts, Rose Valley, PA (US); Matthew Roberts, Downingtown, PA (US)

(73) Assignee: Roberts Water Technologies, Inc., Coatesville, PA (US)

( * ) Notice: Subject to any disclaimer, the term of this patent is extended or adjusted under 35 U.S.C. 154(b) by 0 days.

(21) Appl. No.: 17/566,085

(22) Filed: Dec. 30, 2021

(65) Prior Publication Data

US 2023/0211259 A1 Jul. 6, 2023

(51) Int. Cl.
*B01D 24/46* (2006.01)
*B01D 24/14* (2006.01)
*C02F 1/00* (2023.01)

(52) U.S. Cl.
CPC ............. *B01D 24/46* (2013.01); *B01D 24/14* (2013.01); *C02F 1/001* (2013.01);
(Continued)

(58) Field of Classification Search
CPC .... B01D 24/14; B01D 2201/34; B01D 23/10; B01D 23/20; B01D 21/2461; B01D 24/46;
(Continued)

(56) References Cited

U.S. PATENT DOCUMENTS 4,076,625 A * 2/1978 Scholten ............... B01D 24/008
210/275
4,322,299 A * 3/1982 Scholten ............... B01D 24/007
210/794

(Continued)

FOREIGN PATENT DOCUMENTS

WO WO-2019089999 A1 * 5/2019 ............. B01D 1/221

OTHER PUBLICATIONS

Ortho, Ortho-Wash™ Troughs: Guaranteed Filter Media Retainage YouTube Video transcript with figures, Jul. 22, 2019, https://www.youtube.com/watch?v=c7IGtHaSo9o&t=129s (Year: 2019).*
(Continued)

*Primary Examiner* — Chester T Barry
(74) *Attorney, Agent, or Firm* — Merek, Blackmon & Voorhees, LLC (57) ABSTRACT

Devices and methods associated with these devices for significantly improving the efficiency of an existing or new filter having a granular media filter bed. The methods and devices are designed to increase the height and hence overall volume of the filter bed to allow for longer filtration runs between washing or cleaning cycles of the granular media filter bed. One embodiment includes a multi-wash trough adapter that upon removal of an existing deep wash trough connects two shallow wash troughs or two shallow wash trough channels to an existing wash trough opening formed in a wall of a filter compartment. The shallow members have a height significantly less than the height of the existing deep wash trough, e.g., one third to one half of the height of the existing deep wash trough allowing the volume of the granular media filter bed to be significantly increased.

25 Claims, 5 Drawing Sheets

(52) U.S. Cl.
CPC .... *B01D 2201/34* (2013.01); *C02F 2201/004* (2013.01); *C02F 2303/16* (2013.01)

(58) Field of Classification Search
CPC ............... C02F 1/001; C02F 2201/004; C02F 2303/16; C02F 1/004
See application file for complete search history.

(56) References Cited

U.S. PATENT DOCUMENTS

| | | | | |
|---|---|---|---|---|
| 5,015,393 | A * | 5/1991 | Russell | B01D 21/2433 |
| | | | | 210/776 |
| 5,084,163 | A * | 1/1992 | Baumann | B01D 24/4869 |
| | | | | 210/275 |
| 5,286,392 | A * | 2/1994 | Shea | B01D 24/4694 |
| | | | | 210/275 |
| 9,295,929 | B2 | 3/2016 | Flores | |
| 10,918,974 | B1 * | 2/2021 | Hylkema | B01D 21/02 |
| 2007/0102339 | A1 * | 5/2007 | Cote | B01D 63/046 |
| | | | | 210/321.89 |
| 2019/0232226 | A1 * | 8/2019 | Cadera | B01D 65/10 |

OTHER PUBLICATIONS

Heather, Transcript and Figures from Heather Video Related Rates, Trough, Sep. 9, 2013, https://www.youtube.com/watch?v=PZgUSWEJX9g (Year: 2013).*

Hassoon, Filtration, 2017, pp. 1-29 (Year: 2017).*

Merriam Webster definition for "Trough", p. 1, Dec. 2020 (Year: 2020).*

* cited by examiner

APPARATUS AND METHOD FOR IMPROVING THE EFFICIENCY OF A NEW OR EXISTING FILTER FOR FILTERING WATER OR WASTEWATER

FIELD OF THE INVENTION

Preferred forms of the present invention are directed to a liquid treatment unit employing a granular media to remove impurities from a liquid processed by the treatment unit. Preferably, the treatment unit is a water or wastewater treatment unit having a bed of granular media to remove impurities from water or wastewater processed by the treatment unit. The treatment unit can take many forms including a clarifier (e.g., an upflow clarifier or downflow clarifier) proceeding one or more polishing or finishing filters or a polishing or finishing filter (e.g., an upflow filter or downflow filter) processing liquid subsequent to the liquid being pretreated by any known pretreatment unit or device including but not limited to a clarifier.

The bed of granular media may be a single layer of filter/clarifier media supported directly on an underdrain of the treatment unit designed/configured to support the filter/clarifier media without one or more layers of gravel. For example, the underdrain may include a porous plate, slotted plate or slotted upper structure that obviates the need for one or more layers of support gravel. Further, the bed of granular media can include one or more filter/clarifier layers supported above the underdrain by one or more gravel support layers.

The preferred forms of the present invention provide means for cost effectively improving the filtering efficiency of an existing and/or a new filter. In one preferred form of the present invention, a multi-wash trough adapter is used to operably connect two or more closely spaced shallow wash troughs or a single shallow wash trough having two or more shallow wash trough channels to an existing single wash trough opening of an existing filter compartment. Preferably, each shallow wash trough or shallow wash trough channel has a height less than the height of an existing wash trough so that the height of the existing filter bed can be increased which in turn significantly increases the volume of the existing filter bed without altering in any way the size of the filter compartment housing the existing filter bed. For example, each shallow wash trough or shallow wash trough channel can have a height that is half (e.g., 12 inches) the height of an existing or conventional wash trough (e.g., 24 inches). This allows the height of the filter bed to be increased by as much as 12 inches and a minimum of 8 inches where a 50% bed expansion for newly added media is required which in turn significantly increases the total filtering volume of the filter bed by the product of the increased height and the area of the filter compartment. Where bed expansion is required to be considered for the newly added media, the height of the bed cannot be increased the full height differential between the conventional wash trough and the shallow wash trough, i.e., 12 inches, due to the need to allow for bed expansion of the newly added media. If 50% bed expansion is required for the newly added media, 8 inches of newly added media can be added allowing for 4 inches of bed expansion for the 8 inches of newly added media. In other words, the bed height can be increased by the difference between the depth or height of a conventional trough and the shallow trough of the present invention minus the height needed to allow for whatever, if any, bed expansion is required for the newly added granular media. The multi-shallow (two or more) wash troughs or multi-shallow (two or more) wash channels replacing a single existing wash trough preferably have a total collection/dispensing volume equaling the collection/dispensing volume of the replaced single existing wash trough.

The preferred forms of the present invention including the two or more shallow wash troughs or two or more shallow wash channels can be used in new filter constructions in which case a multi-wash trough adapter would not be necessary as the wall of the new filter compartment would be configured to receive in a sealing manner the two or more shallow wash troughs or two or more shallow wash channels.

The multi-wash trough adapter can be configured to be operably connected to a single existing wash trough opening or a plurality of existing wash trough openings (e.g., two or more).

The preferred forms of the present invention include flow control means for controlling the flow of liquid between the two or more closely spaced shallow wash troughs. The flow control means can take the form of an adjustable flow control plate having a plurality of notches formed in an uppermost portion of the adjustable flow control plate connected to each of the inner walls of the two or more closely spaced shallow wash troughs. Alternatively, the flow control means can take the form of a plurality of notches formed in the uppermost portion of each of the inner walls of the two or more closely spaced shallow wash troughs. Further, the flow control means can take the forming of openings/orifices formed in opposing inner walls of two closely spaced wash trough channels of a single shallow wash trough.

BACKGROUND OF THE INVENTION

In a treatment unit having a bed of granular media including one or more layers of filter/clarifier media configured to remove impurities from the liquid to be processed, it is imperative that the granular media be periodically washed to remove impurities trapped in the granular media during a filtration or impurity removal cycle, mode, stage or phase. If the washing cycle, mode, stage or phase is not properly performed, the efficiency of the treatment unit will be greatly reduced as the filtering cycle or impurity removal cycle, mode, stage or phase will be shortened which necessarily will reduce the time the treatment unit can treat liquid to be processed.

It is customary to wash a bed of granular filter media with air only, water only and/or simultaneous air and water. The more frequently a bed of granular filter media needs to be operated in a wash or cleaning cycle necessarily decreases the efficiency of the filter as during the entire period of the cleaning or washing cycle, the filter cannot filter water or wastewater. The frequency at which a granular media filter bed must be cleaned or washed is dependent on the height/volume of the filter bed. The height and hence volume of the filter bed is directly dependent on the distance between the bottom of the wash troughs disposed above the uppermost portion of the filter bed. Conventional wash troughs are deep (e.g., have a height of 24 inches) which necessarily reduces the height and overall volume of the filter bed due to the deep nature of conventional wash troughs.

Hence, there is a real and immediate need for devices and methods that increase the height and hence overall volume of the filter bed to significantly reduce the frequency at which a granular media filter bed is washed or cleaned and thereby significantly increase the efficiency of the filter or treatment unit.

OBJECTS AND SUMMARY OF THE INVENTION

An object of a preferred form of the present invention is to provide a novel and unobvious device and/or process for increasing the efficiency of an existing or new granular media filter for filtering water or wastewater.

Another object of a preferred form of the present invention is directed to a method and/or device for retrofitting existing granular media water and/or wastewater treatment units to increase the height and hence overall volume of existing granular media beds without altering the size of the compartment housing a given granular media bed.

A further object of a preferred form of the present invention is directed to a multi-wash trough adapter that connects two or more shallow wash troughs or two or more shallow wash trough channels to an existing deep wash trough opening formed in a wall of a compartment so that the height of the granular media can be increased by the difference between the height of the two or more shallow wash troughs or two or more shallow wash trough channels and the existing deep wash trough.

Still another object of a preferred form of the present invention is to provide a single wash trough having two or more closely spaced shallow wash trough channels that allow the height and hence volume of a granular media bed of an existing treatment unit or a new treatment unit to be increased wherein each of the two or more closely spaced wash trough channels are configured such that a fluid can flow into and from each of the two sides of the wash trough or wash trough channels.

Still a further object of a preferred form of the present invention is to provide two or more closely spaced shallow wash troughs that are configured to reduce the fluid flow rated caused by the close spacing of the two or more closely spaced shallow wash troughs.

Yet another object of a preferred form on the present invention is to provide a flow control means or member which is one of the following: (i) a plate having a plurality of notches formed in an upper portion of the plate, wherein the plate is connected to at least one of the at least two closely spaced wash troughs; (ii) a plurality of notches formed in an upper portion of at least one wall of each of the at least two closely spaced wash troughs; and, (iii) a plurality of openings/orifices formed in opposing inner walls of two closely spaced wash trough channels of a single shallow wash trough.

Yet a further object of a preferred form on the present invention is to provide an adjustable flow control means connected to each of two or more closely spaced shallow wash troughs that allows the position of the adjustable flow control means to be varied relative to the corresponding shallow wash trough.

Yet still another object of a preferred form on the present invention is to provide a multi-wash trough adapter connected to a plurality of existing wash trough openings in a wall of a filter compartment configured to connect two or more shallow wash troughs or two or more shallow wash trough channels to each of the plurality of existing wash trough openings.

Another object of a preferred form of the present invention is to provide a multi-wash trough adapter configured to allow each of a plurality of shallow wash troughs connected to the multi-wash trough adapter to be readily disconnected and removed from the multi-wash trough adapter.

A further object of a preferred form of the present invention is to provide one more seals configured to readily seat on a portion or portions of a multi-wash trough adapter to seal the connection of two or more shallow wash troughs or two or more shallow wash trough channels to the multi-wash trough adapter.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention. Further, the above is not an exhaustive list of the advantages and objects of the preferred forms of the present invention. Other advantages and objects of preferred forms of the present invention will be readily appreciated from the description of the preferred forms of the present invention.

In summary, one preferred embodiment of the present invention is directed to a method of retrofitting an existing treatment unit having a granular media bed for removing impurities from a liquid and one or more wash troughs disposed above the granular media bed. The method includes the step of providing a multi-wash trough adapter configured to operably connect at least two new wash troughs or at least two new wash trough channels to a first existing wash trough opening formed in a wall of a compartment housing the granular media bed of the existing treatment unit so that at least two new wash troughs or at least two new wash trough channels are operably connected to the first existing wash trough opening so that a fluid collected by each of the at least two new wash troughs or the at least two new wash trough channels exits the compartment by way of the first existing wash trough opening.

Another preferred embodiment of the present invention is directed to a multi-wash trough adapter including a first portion configured to be connected to an existing wash trough opening formed in a wall of a compartment of an existing treatment unit housing a granular media bed for removing impurities from a liquid and a second portion configured to receive at least two new wash trough channels wherein the multi-wash trough adapter is configured to direct fluid collected by the at least two new wash trough channels through the existing wash trough opening formed in the wall of the compartment of the existing treatment unit.

A further embodiment of the present invention is directed to a treatment unit for removing impurities from liquid including a granular media bed for removing impurities from a liquid including at least one layer of granular media and an underdrain disposed below the granular media bed for directing a fluid to be treated through the granular media bed and collecting a washing fluid passing through the granular media bed. The treatment unit further includes at least two closely spaced wash troughs wherein the spacing between the two closely spaced wash troughs is equal to or less than eighteen inches. The treatment unit further includes a flow control member configured to reduce a rate of fluid flow between and into the at least two closely spaced wash troughs caused by spacing of the at least two closely spaced wash troughs.

Still a further embodiment of the present invention is directed to a treatment unit including a granular media bed for removing impurities from a liquid. The granular media bed includes at least one layer of granular media. The treatment unit includes an underdrain disposed below the granular media bed for directing a fluid to be treated through the granular media bed and collecting a washing fluid passing through the granular media bed. The treatment unit includes a single wash trough having at least two closely spaced wash trough channels wherein a spacing between each wash trough channel is equal to or less than eighteen inches. Each of the two wash trough channels have an inner wall and an outer wall. The inner wall includes a plurality of openings spaced along a length of the inner wall to allow a fluid flowing between the two wash trough channels to enter or exit a corresponding wash trough channel through the plurality of openings.

The above summary describes preferred forms of the present invention and is not in any way to be construed as limiting the claimed invention to the preferred forms.

DETAILED DESCRIPTION OF THE PREFERRED EMBODIMENTS OF THE INVENTION

Figure 1:
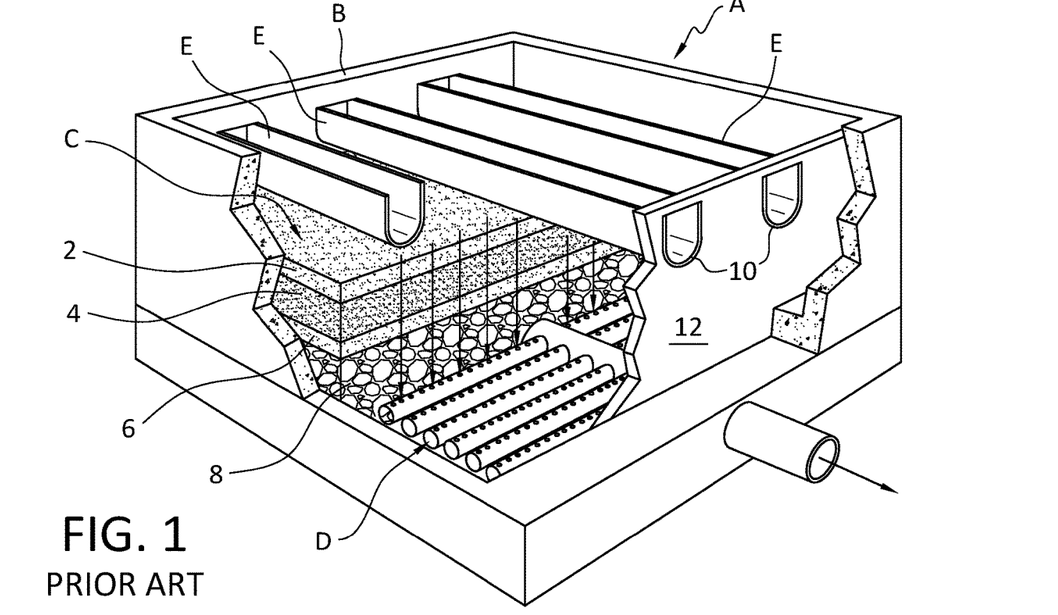
FIG. 1 is a fragmentary perspective view of one of many types of conventional filters having three conventional wash troughs.
Figure 2:
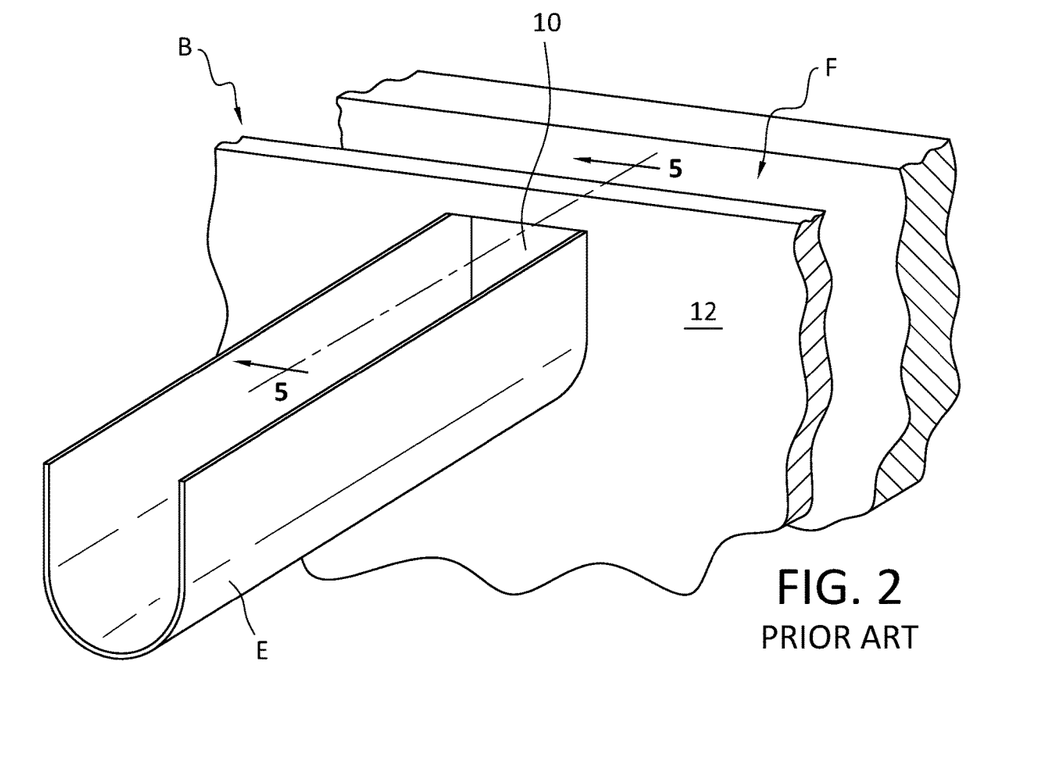
FIG. 2 is an enlarged fragmentary perspective view of a portion of the filter depicted in FIG. 1.

The preferred forms of the invention are described below with reference to FIGS. 3, 4 and 6 to 10. The appended claims are not limited to the preferred forms and no term and/or phrase used herein is to be given a meaning other than its ordinary meaning unless it is expressly stated otherwise. Treatment unit as used herein does not include circular tanks and/or pressure vessels. FIGS. 1, 2 and 5 will be discussed to highlight the significant contributions/advancements provided by the present invention over the prior art.

The preferred forms of the present invention are directed to treatment units employing granular media above an underdrain to remove impurities from liquids processed by the treatment unit and/or one or more components of a treatment unit. The treatment unit can take many forms including a treatment unit in which liquid to be processed (e.g., impurities removed from) travels in the same direction or the opposite direction as the washing fluid be it a gas, liquid or a combination of a gas or liquid as the washing fluids. The treatment unit can be a pretreatment unit proceeding one or more subsequent processing stages. For example, the pretreatment unit can be an upflow clarifier or a downflow clarifier preceding one or more subsequent treatment units. In an upflow clarifier, liquid to be processed (i.e., to have impurities removed therefrom) flows upwardly through the granular media. Conversely, in a downflow clarifier, the liquid to be processed is directed downwardly through the granular media.

The treatment unit can be a final stage of a liquid treatment system including but not limited to an upflow polishing filter and a downflow polishing filter. In addition, the treatment unit can be an intermediary component between a clarifier or other initial treatment component and a final polishing filter or final treatment unit. The treatment unit can take the form of a water treatment unit, a wastewater treatment unit or any other treatment unit that employs granular media to remove impurities from a fluid or liquid to be processed.

The granular media can be a single layer of media that is designed to remove impurities from a liquid to be processed. The single layer of media can be supported directly on an underdrain or on a media retaining plate or structure connected to the underdrain. The granular media can include two or more layers of media designed to remove impurities from a liquid to be processed supported directly on the underdrain or on a media retaining plate or structure connected to the underdrain. The granular media including one or more layers of impurity removing media can be disposed on and supported by one or more layers of support gravel disposed on the underdrain.

FIGS. 1, 2 and 5

FIG. 1 depicts one of many types of conventional granular media filters. Filter A includes a filter compartment B housing a granular media filter bed C including three layers of filter media 2, 4, 6 supported by a gravel layer 8 above underdrain D. Above the filter bed C are three spaced deep wash troughs E each having a depth or height of 24 inches. The outer two deep wash troughs E are typically spaced 3 feet from a the corresponding wall of compartment B that extends parallel to the longitudinal axis of the corresponding deep wash trough E. The middle deep wash trough E is typically spaced 6 feet from each of the outer two deep wash troughs E.

It is important to note that the present invention is not limited to the granular media filter bed depicted in FIGS. 1 and 2 as the granular media filter bed could consist of a single layer of filter media, two layers of filter media or more than three layers of filter media. Further, the underdrain can be of any suitable form including a form that does not require one or more layers of support gravel. For example, the underdrain could include a plurality of underdrain blocks having a media support plate or slotted upper structure that obviates the need for one or more layers of support gravel. As opposed to underdrain blocks, the underdrain could include a plurality of underdrain laterals each running the length of the filter compartment. The underdrain could also be, for example, a wheeler bottom underdrain. Existing wash trough openings 10 formed in wall 12 of filter compartment B are best seen in FIG. 1.

During a washing cycle, phase, stage or mode, the washing liquid is collected by the deep wash troughs E and discharged through wash trough openings 10 into a collection channel or area F that is fluidly connected to a waste tank or other waste collecting device or means (not shown).

FIGS. 3, 4 and 6 to 10

Figure 3:
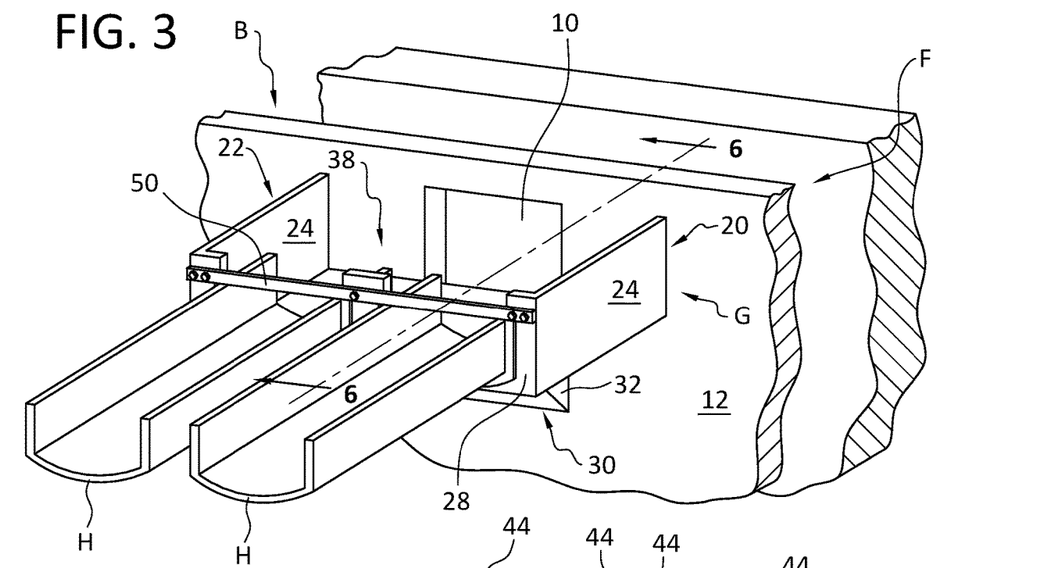
FIG. 3 is an enlarged fragmentary perspective view of a portion of the filter depicted in FIG. 2 with a preferred multi-wash trough adapter operably connecting two closely spaced shallow wash troughs to a wash trough opening in a wall of a filter compartment of an existing filter.
Figure 4:
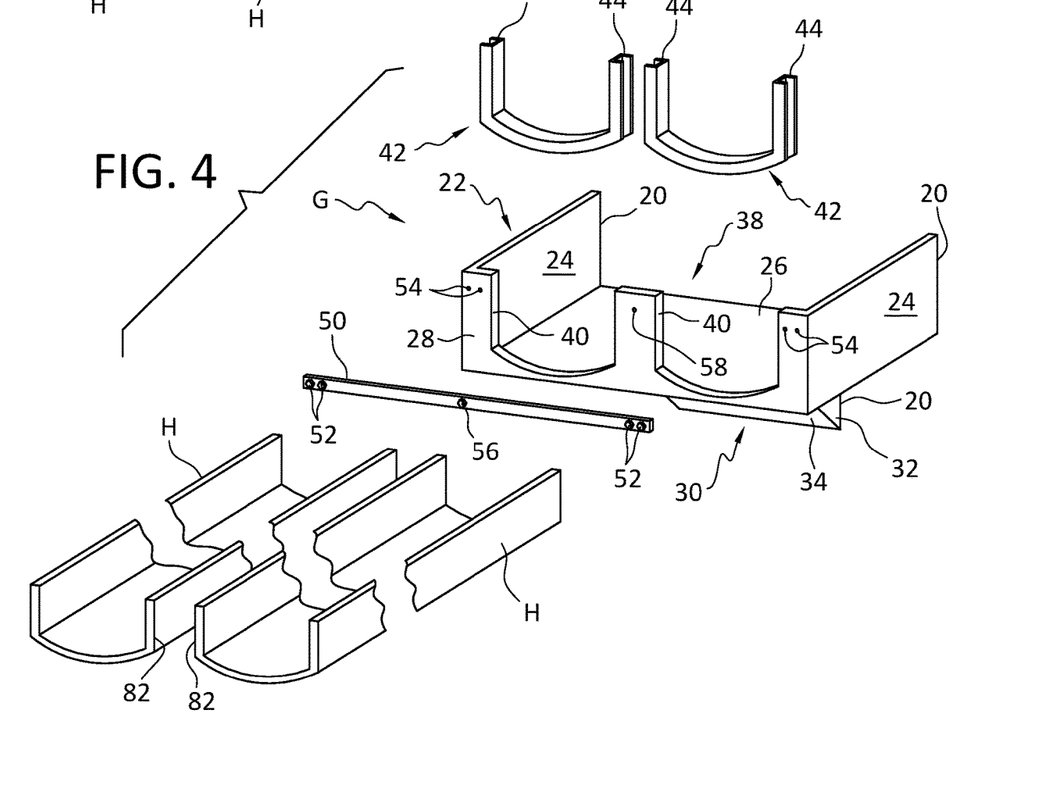
FIG. 4 is an exploded perspective view of the preferred multi-wash trough adapter depicted in FIG. 3.
Figure 5:
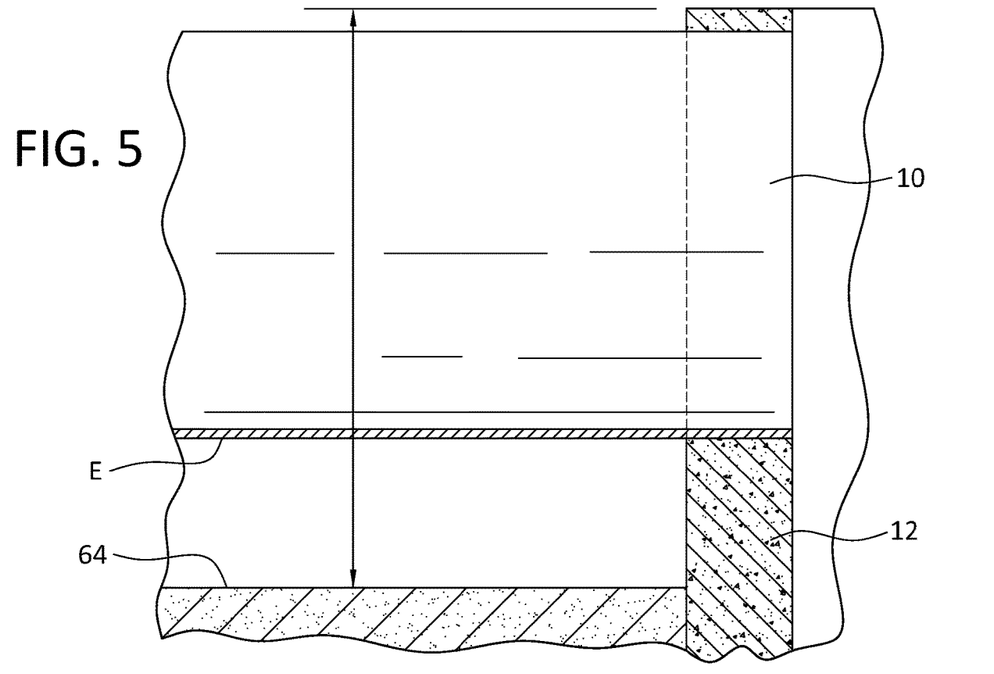
FIG. 5 is a cross-sectional view, taken along line 5-5 of FIG. 2, of a portion of a conventional filter illustrating the spacing between the uppermost portion of the filter bed and a lowermost portion of a conventional wash trough.
Figure 6:
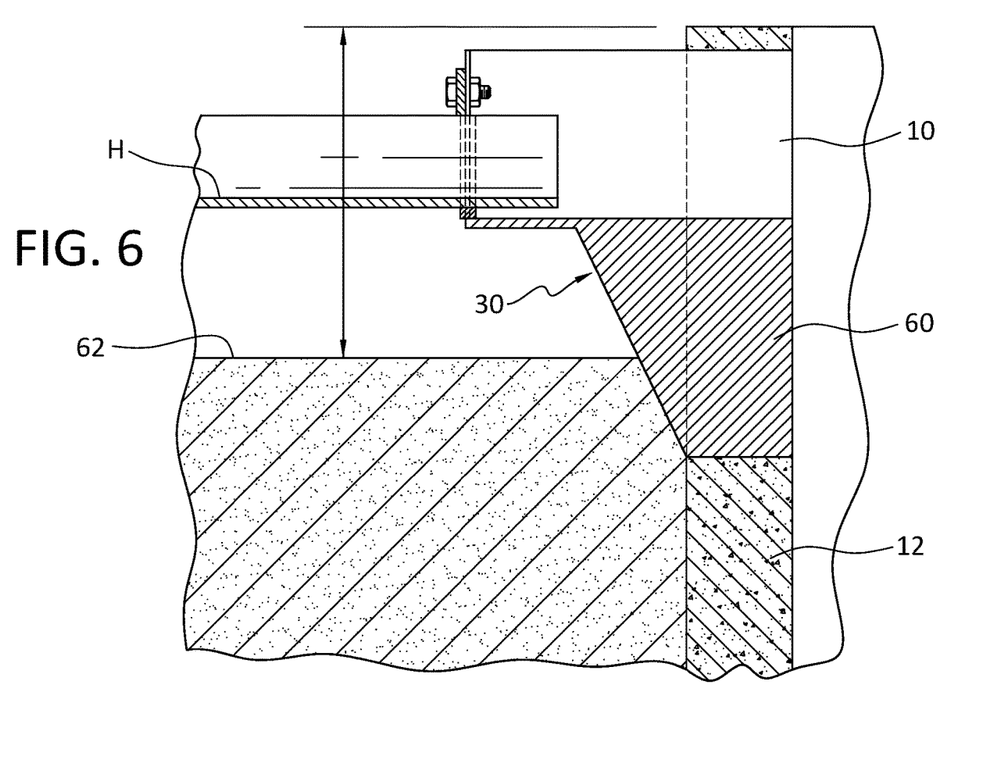
FIG. 6 is a cross-sectional view, taken along line 6-6 of FIG. 3, of a portion of a filter utilizing a preferred form of the present invention illustrating the greater height of the filter bed achieved by utilizing the two closely spaced wash troughs in place of a single deep conventional wash trough.

Referring to FIGS. 3, 4 and 6, a preferred form of the invention is illustrated in one of many possible configurations. Referring to FIG. 3, a preferred multi-wash trough adapter G is illustrated in one of many possible configurations. The preferred multi-wash trough adapter G is configured to connect two shallow wash troughs H to a single existing deep wash trough opening 10 formed in a wall 12 of an existing filter compartment B housing a granular media filter bed. Wall 12 preferably runs along the length of the collection area F.

An outer end 20 (i.e., end closet to wall 12) of the multi-wash trough adapter G is connected in a sealed manner to wall 12 around existing deep wash trough opening 10 so that a liquid cannot pass through opening 10 without first passing through one of the two shallow wash troughs H. A sealant can be applied around the corresponding portion of outer end 20 or a seal can be configured to conform to the shape of outer end 20 and be positioned between outer end 20 and wall 12. Any other sealing method can be utilized or employed.

The multi-wash trough adapter G has a box shaped upper section 22 having opposing sidewalls 24, a bottom wall 26 and an inner wall 28. The multi-wash trough adapter G has a lower section 30 having two opposing walls 32 (only one of which is shown) connected by a bottom wall 34. Lower section 30 seals the lower half or lower portion of the deep wash trough opening 10.

Upper section 22 forms an internal liquid collection chamber 38 to collect liquid from each of the shallow wash troughs H and direct the collected liquid through the opening 10. The portion of bottom wall 26 that extends across the width of opening 10 can be offset inwardly to form an inwardly extending notch in bottom wall 26 so that a liquid can flow downwardly and into lower section 30 and out the lower portion of deep wash trough opening 10.

Inner wall 28 includes a pair of notches or recesses 40 with each notch or recess 40 having a sufficient size to receive a shallow wash trough H. As seen in FIG. 3, the ends of each wash trough H extend into liquid collection chamber 38. Each notch or recess preferably has a shape complimentary to the shape of shallow wash troughs H. While shallow wash troughs H and notches 40 are shown as being generally U-shaped, the shallow wash troughs H and notches 40 can be formed in any other suitable shape.

Seals 42 preferably have a complimentary shape to the shape of notches 40. Each seal 42 includes an inner recess 44 that extends the length of seal 42. Recess 44 is sized to receive the portion of inner wall 28 defining each notch 40 so that seal 42 can seat on the corresponding portion of inner wall 28. Seals 42 seal the juncture of troughs H and inner wall 28 to prevent a liquid from passing between troughs H and the portion of inner wall 28 surrounding troughs H.

A detachable connector 50 is preferably detachably connected to inner wall 28 to detachably connect troughs H to the adapter G. Bolts, screws or any other suitable fasteners can be used to detachably connect member 50 to inner wall 28. As shown in FIGS. 3 and 4, a pair of fasteners 52 can connect each end of member 50 using preformed openings 54 formed in outer portions of inner wall 28. A single fastener 56 can connect the middle portion of member 50 to a middle portion of inner wall 28 using preformed opening 58.

Referring to FIG. 6, a connecting portion 60 of lower section 30 can extend into opening 10. Fasteners (e.g., bolts, screws, etc.) extending through connecting portion 60 and a surface of wall 12 defining opening 10 can be employed to securely and detachably connect adapter G to wall 12.

Referring to FIGS. 5 and 6, it can be readily seen how adapter G and shallow wash troughs H allow the height and hence volume of an existing granular media bed to be significantly increased. In FIG. 5, a deep wash trough (24 inches deep or high) is shown. Specifically, an uppermost portion 64 of the granular media bed is significantly lower than the bottommost portion of opening 10. In FIG. 6, additional media can be added so that the height of granular media bed extends above the bottommost portion of opening 10 while maintaining the same distance between the bottom of the troughs H and the uppermost portion 62 of the bed as the distance between deep wash troughs E and the uppermost portion 64. Where the troughs H have a depth or height of 12 inches, the height of the granular media bed can be increased by as much as 12 inches where no bed expansion is required to be considered for the newly added media and a minimum of 8 inches where a 50% bed expansion is required for the newly added media, i.e., the bed height can be increased by the difference between the depth or height of trough E and trough H minus the height needed to allow for bed expansion of the newly added granular media. Increasing the height of the bed by 8 to 12 inches increases the volume of the bed by the product of the increased height and the area of the filter compartment or area of the existing bed. This significant increase in volume of the bed significantly prolongs filter runs and hence the efficiency of the filter or treatment unit. Further, the increased bed volume is achieved without altering the size of an existing filter compartment. In fact, the only change to an existing treatment unit is the removal of the deep wash troughs and replacement with shallow wash troughs and the corresponding adapter.

Preferably, the total collection volume of the two wash troughs His the same or substantially the same as the collection volume of trough E.

While the troughs H preferably have a height of one half or approximately one half of the height of wash trough E, other height differentials can be employed. For example, troughs H could have a height of one third or approximately one third of the height of wash trough E. Further, it is to be noted that adapter G could be formed to connect more than two shallow wash troughs to an existing wash trough channel opening 10.

Further, any other suitable means can be used to seal the connection of adapter G to wall 12. Similarly, any other suitable means can be used to connect and seal shallow wash troughs H to adapter G.

Figure 7:
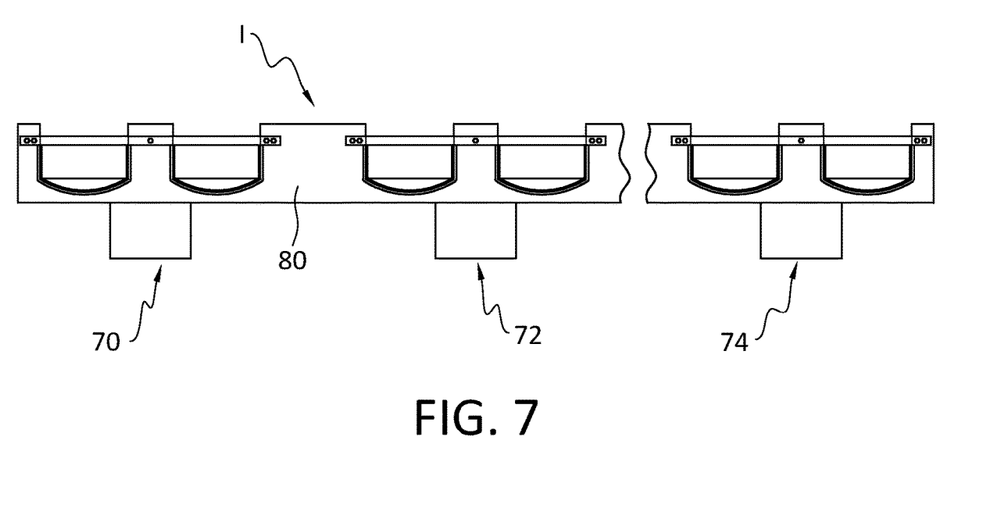
FIG. 7 is an end view as seen from inside of a filter compartment of a preferred multi-wash trough adapter operably connected to three (3) existing wash trough openings formed in a wall of an existing filter compartment.

Referring to FIG. 7, an alternative form of adapter is shown. Adapter I includes three integral and connected sections 70, 72 and 74 formed similar or in the same manner as adapter G to connect adapter I to each of the three openings 10 shown in FIG. 1, i.e., each section is connected to a single existing wash trough opening. Inner wall 80 of adapter I can be formed from one or more pieces of material.

Adapters G and I can be configured to space two shallow wash troughs H connected to a single wash trough opening six to twelve inches from each other. However, the spacing can be less than six inches or more than twelve inches. This spacing refers to the distance from inner wall 82 of one of the two shallow wash troughs H to inner wall 82 of the other of the two shallow wash troughs as seen in, for example, FIG. 4.

Figure 8:
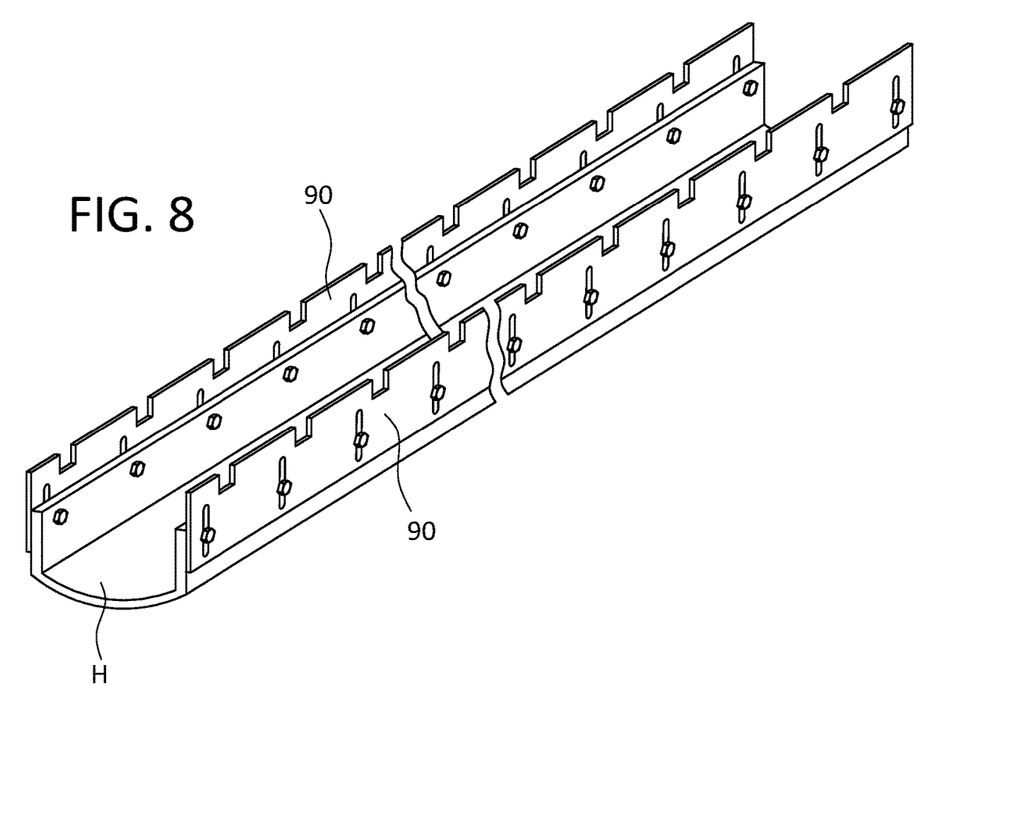
FIG. 8 is a fragmentary perspective view of a shallow wash trough with adjustable flow control plates adjustably connected to opposing vertically extending walls of the shallow wash trough.
Figures 9, 10:
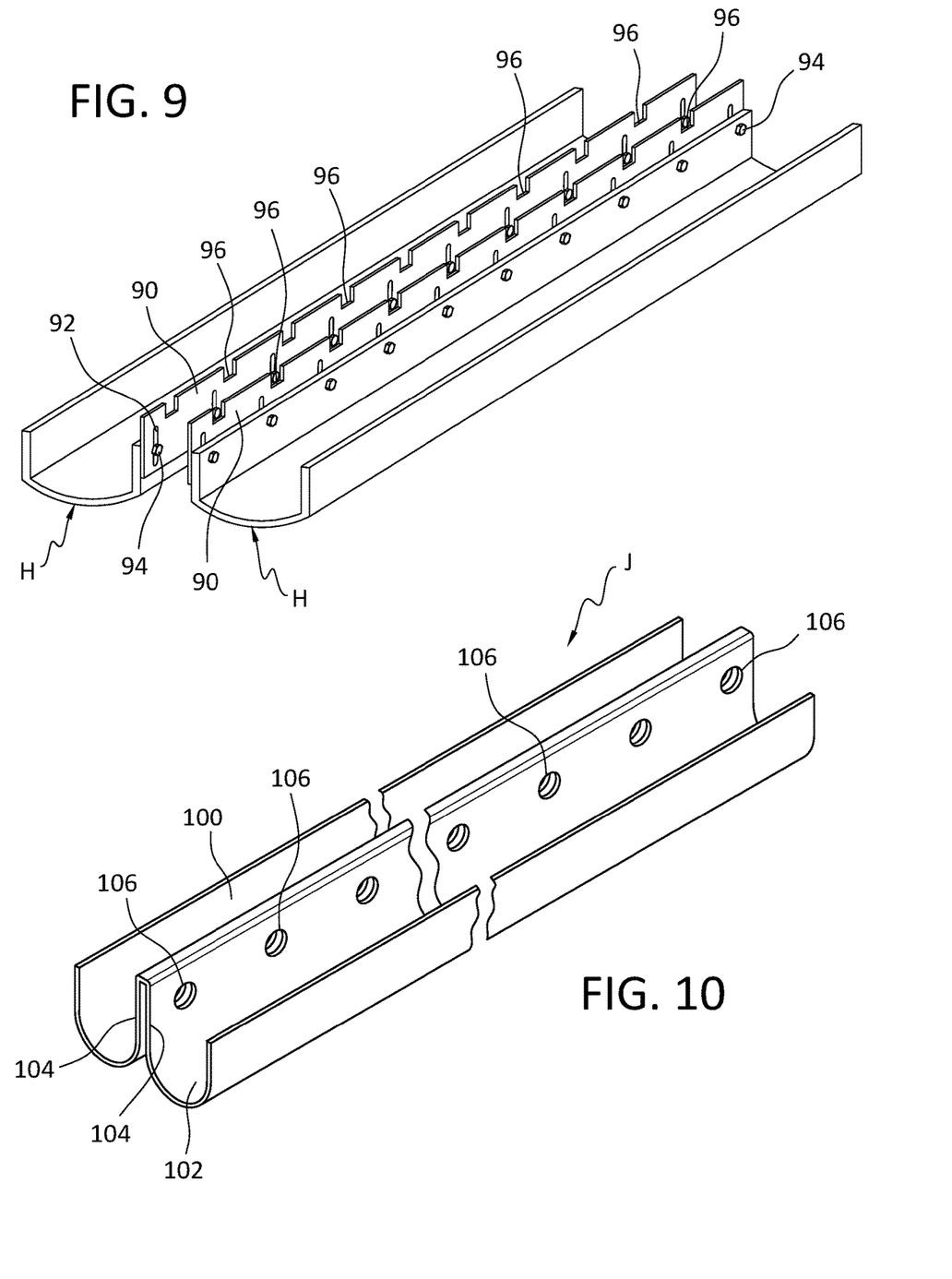
FIG. 9 is a perspective view of two closely spaced shallow wash trough with an adjustable flow control plate adjustably connected to the inner vertically extending wall of each of the shallow wash troughs.
FIG. 10 is a fragmentary perspective view of a single shallow wash trough with dual shallow wash trough channels.

Referring to FIGS. 8, 9 and 10, preferred forms of flow control member will now be described. The close spacing of two adjacent shallow wash troughs H will result in an increase in the rate of fluid flow between inner walls 82 of the two shallow wash troughs H. The same is true of two closely spaced wash trough channels of a single shallow wash trough (See FIG. 10). Referring to FIG. 9, a height adjustable flow control plate 90 is detachably connected to each inner wall 82 of two adjacent shallow wash troughs H. Each plate 90 includes a plurality of vertically extending elongated slots 92 and a corresponding fastener 94 to allow the height of plate 90 to be adjusted relative to inner wall 82. Each plate 90 further includes a plurality of flow control notches 96 formed in the upper edge of plate 90. The flow control notches 96 act to reduce the rate of flow of fluid between inner walls 82 and into wash troughs H. The flow control notches 96 are shown as being of uniform size and uniformly spaced. However, the size and spacing of flow control notches 96 can be readily varied as desired to adjust fluid flow, as necessary. While flow control notches 96 are shown as being formed in a plate attached to the inner walls 82, the flow control notches 96 can be formed in the upper edge of each inner wall 82 of the two shallow and closely spaced wash troughs H. The outer walls of each of the shallow wash troughs H depicted in FIG. 9 will have an adjustable plate identical to plate 90 with the exception that no notches are formed in the adjustable plate connected to the outer walls of the shallow wash troughs H depicted in FIG. 9. The uppermost surface of the each of the notchless adjustable plates will be horizontally aligned with the base or bottom of notches 96 of the corresponding plate 90 so that the upper surface of the notchless adjustable plates will extend in the same horizontal plane as the bottom surface of notches 96 of the corresponding plate 90.

Referring to FIG. 8, an adjustable flow control plate 90 is attached to each opposing and vertically extending wall of wash trough H. FIG. 8 illustrates a form of shallow wash trough to be positioned between two other shallow wash troughs.

Referring to FIG. 10, a further alternative embodiment is shown in which the flow control means includes a plurality of openings explained below. Shallow wash trough J has two shallow wash trough channels 100 and 102. Each channel 100 and 102 includes an inner wall 104 having a flow control means which includes a plurality of openings 106 to allow liquid to enter and escape from the corresponding channel through openings 106 and control the rate of fluid flow between the two closely spaced channels 100 and 102. Hence, a liquid can enter and escape from each of the two sides of channels 100 and 102. While trough J is shown as having two shallow wash trough channels, three or more shallow wash trough channels can be employed. Preferably, trough J is formed from a single piece of material. Where trough J is used in place of wash troughs H the innermost wall of the adapter will be shaped to receive the wash trough of this embodiment.

It is to be noted that the two or more closely spaced wash troughs H or the single dual channel wash trough J can be used in new filter or treatment unit constructions. In this case, an adapter can be omitted as a wall of a new filter or treatment compartment can be formed with openings conforming to the corresponding type of shallow wash trough.

The adapters and wash troughs discussed above can be formed of any suitable material including but not limited to fiberglass, plastic, metal and stainless steel. The adapters and one or more corresponding wash can be formed as a single piece, for example, be molded as a single piece of fiberglass.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. A method of retrofitting an existing treatment unit having a granular media bed for removing impurities from a liquid and one or more wash troughs disposed above the granular media bed, said method comprising the step of:
   (a) providing a multi-wash trough adapter configured to operably connect at least two new wash troughs or at least two new wash trough channels to a first existing wash trough opening formed in a wall of a compartment housing the granular media bed of the existing treatment unit so that the at least two new wash troughs or the at least two new wash trough channels are operably connected to the first existing wash trough opening so that a fluid collected by each of the at least two new wash troughs or the at least two new wash trough channels exits the compartment by way of the first existing wash trough opening.

2. The method of claim 1, further including the steps of:
   (a) removing an existing wash trough from the first existing wash trough opening of the compartment housing the granular media bed of the existing treatment unit;
   (b) inserting a portion of the multi-wash trough adapter into the first existing wash trough opening formed in the wall of the existing treatment unit; and,
   (c) attaching at least two new wash troughs or at least two wash troughs channels to the multi-wash trough adapter so that fluid collected by each of the at least two new wash troughs exits the existing treatment unit by way of the first existing wash trough opening.

3. The method of claim 2, further including the step of:
   (a) sealing a juncture of the multi-wash trough adapter and the wall of the compartment housing the granular media bed.

4. The method of claim 2, wherein:
   (a) the at least two new wash troughs or the at least two new wash trough channels each have a height less than the existing wash trough; and,
   (b) adding granular media based on change in height of the removed existing wash trough and the at least two new wash troughs or the at least two new wash trough channels.

5. The method of claim 4, wherein:
   (a) the at least two new wash troughs or at least two new wash trough channels each having a first height, wherein the first height is in the range of approximately ⅓ to approximately ½ a height of the removed existing wash trough.

6. The method of claim 5, wherein:
(a) the at least two new wash troughs or at least two new wash trough channels collectively have a volume at least equal to a volume of the removed existing wash trough.

7. A multi-wash trough adapter, said multi-wash trough adapter including:
(a) a first portion configured to be connected to an existing wash trough opening formed in a wall of a compartment of an existing treatment unit housing a granular media bed for removing impurities from a liquid; and,
(b) a second portion configured to receive at least two new wash trough channels wherein the multi-wash trough adapter is configured to direct fluid collected by the at least two new wash trough channels through the existing wash trough opening formed in the wall of the compartment of the existing treatment unit.

8. The multi-wash trough adapter of claim 7, wherein:
(a) the at least two new wash trough channels are formed by a single new wash trough.

9. The multi-wash trough adapter of claim 7, wherein:
(a) the at least two new wash trough channels are each formed by a separate new wash trough; and,
(b) the first portion is configured to extend into the existing wash trough opening formed in the wall of the existing treatment unit.

10. The multi-wash trough adapter of claim 7, further including:
(a) a detachable connector detachably connected to the second portion of the multi-wash trough adapter detachably connecting the at least two new wash trough channels to said multi-wash trough adapter, wherein the at least two new wash trough channels can be removed from the multi-wash trough adapter upon detachment of the detachable connector from the second portion of the multi-wash trough adapter.

11. The multi-wash trough adapter of claim 7, wherein:
(a) the second portion of the multi-wash trough adapter includes at least one seal that seals a connection of the at least two new wash trough channels to the multi-wash trough adapter.

12. The multi-wash trough adapter of claim 11, wherein:
(a) the at least one seal includes a recess for receiving a section of the second portion of the multi-wash trough adapter to seat the at least one seal on the second portion of the multi-wash trough adapter.

13. The multi-wash trough adapter of claim 7, wherein:
(a) said multi-wash trough adapter is configured to be connected in a sealed manner to a plurality of existing wash trough openings formed in the compartment of the existing treatment unit; and,
(b) said multi-wash trough adapter is configured to receive a plurality of pairs of new wash trough channels, one pair of new wash trough channels for each of the plurality of existing wash trough openings of the compartment of the existing treatment unit.

14. The method of claim 1, wherein:
(a) the multi-wash trough adapter is configured to support the at least two new wash troughs or the at least two new wash trough channels so that a lowermost portion of the each of the at least two new wash troughs or a lowermost portion of each of the at least two new wash trough channels is disposed above a lowermost portion of the first existing wash trough opening.

15. The method of claim 1, wherein:
(a) the multi-wash trough adapter is configured to support the at least two new wash troughs or the at least two new wash trough channels so that no portion of each of the at least two new wash troughs or no portion of each of the at least two new wash trough channels extends below a lowermost portion of the first existing wash trough opening.

16. The method of claim 1, wherein:
(a) the multi-wash trough adapter includes a first section having a first sidewall and a second sidewall, said first sidewall is spaced from said second sidewall a distance greater than a width of a widest portion of the first existing wash trough opening so that the first existing washing trough opening is disposed between said first sidewall and said second sidewall.

17. The method of claim 16, wherein:
(a) said first section forms an uppermost portion of the multi-wash trough adapter.

18. The method of claim 1, wherein:
(a) no granular media is removed from the granular media bed of the existing treatment unit.

19. The multi-wash trough adapter of claim 7, wherein:
(a) the second portion of the multi-wash trough adapter is configured to support the at least two new wash trough channels so that a lowermost portion of each of the at least two new wash trough channels is disposed above a lowermost portion of the first existing wash trough opening.

20. The multi-wash trough adapter of claim 7, wherein:
(a) the second portion of the multi-wash trough adapter is configured to support the at least two new wash trough channels so that no portion of each of the at least two new wash trough channels is disposed below a lowermost portion of the first existing wash trough opening.

21. The multi-wash trough adapter of claim 7, wherein:
(a) the second portion of the multi-wash trough adapter includes a first sidewall and a second sidewall, said first sidewall is spaced from said second sidewall a distance greater than a width of a widest most portion of the first existing wash trough opening so that the first existing washing trough opening is disposed between said first sidewall and said second sidewall.

22. A method of retrofitting an existing treatment unit with an existing granular media bed having a first volume of filter media for removing impurities from a liquid and one or more existing deep wash troughs disposed above the existing granular media bed wherein during retrofitting at least one of the one or more existing deep wash troughs are replaced with two new shallow wash trough channels and granular media is added to the existing granular media bed to increase the first volume of filter media to a second volume of filter media greater than the first volume of filter media to improve filter efficiency, said method comprising the step of:
(a) removing, from an existing deep wash trough opening formed in a wall of a compartment housing the existing granular media bed of the existing treatment unit, an existing deep wash trough having a first height and an upper opening extending a length of the deep wash trough wherein prior to removal the existing deep wash trough collected a washing liquid passing upwardly through the existing granular media bed and the washing liquid entered the existing deep wash trough through the upper opening;
(b) connecting a first end of a multi-wash trough adapter to the existing deep wash trough opening formed in a wall of the compartment housing the existing granular media bed of the existing treatment unit;
(c) connecting two new shallow wash trough channels each having a second height to a second end of the multi-wash trough adapter so that washing liquid introduced into the existing treatment unit during a washing cycle is collected and carried by the two new shallow wash trough channels to and through the existing deep wash trough opening, wherein the second height is less than the first height; and, (d) adding granular media to the existing granular media bed based on a height differential of the first height and the second height to increase the first volume of filter media to the second volume of filter media greater than the first volume of filter media to improve filter efficiency.

23. The method of claim 22, wherein:
(a) the first height is 24 inches and no portion of each of the at least two new wash trough channels is disposed below a lowermost portion of the first existing wash trough opening; and,
(b) the multi-wash trough adapter includes a first sidewall and a second sidewall, said first sidewall is spaced from said second sidewall a distance greater than a width of a widest most portion of the first existing wash trough opening so that the first existing washing trough opening is disposed between said first sidewall and said second sidewall.

24. The method of claim 23, wherein:
(a) the second end of the multi-wash adapter includes two U-shaped openings each being configured to receive a new shallow wash trough wherein a lowermost portion of one of the two U-shaped openings is horizontally aligned with a lowermost portion of another of the two U-shaped openings.

25. The method of claim 24, wherein:
(a) a horizontally extending connecting bar extends horizontally across an upper portion of each of the two U-shaped openings to detachably connect two new shallow wash troughs to the second end of the multi-wash trough adapter.

* * * * *